US010981664B2

(12) United States Patent
Jensen et al.

(10) Patent No.: US 10,981,664 B2
(45) Date of Patent: Apr. 20, 2021

(54) CATALYTIC INERTING SYSTEM FOR AN AIRCRAFT WITH MULTIPLE FUEL TANKS

(71) Applicant: Parker-Hannifin Corporation, Cleveland, OH (US)

(72) Inventors: Bryan David Jensen, Mission Viejo, CA (US); John William Hayden, Irvine, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 364 days.

(21) Appl. No.: 16/065,474

(22) PCT Filed: Jan. 19, 2017

(86) PCT No.: PCT/US2017/014023
§ 371 (c)(1),
(2) Date: Jun. 22, 2018

(87) PCT Pub. No.: WO2017/127478
PCT Pub. Date: Jul. 27, 2017

(65) Prior Publication Data
US 2019/0002119 A1     Jan. 3, 2019

Related U.S. Application Data

(60) Provisional application No. 62/281,757, filed on Jan. 22, 2016.

(51) Int. Cl.
*B01D 53/02*     (2006.01)
*B64D 37/32*     (2006.01)
(Continued)

(52) U.S. Cl.
CPC ........... *B64D 37/32* (2013.01); *B01D 53/265* (2013.01); *B01D 53/8671* (2013.01); *B01D 2257/104* (2013.01); *B01D 2259/4575* (2013.01)

(58) Field of Classification Search
CPC ...... B01D 2257/104; B01D 2259/4575; B01D 53/265; B01D 53/8671; B64D 37/32
See application file for complete search history.

(56) References Cited

U.S. PATENT DOCUMENTS 3,732,668 A    5/1973   Nichols
3,847,298 A    11/1974  Hamilton
(Continued)

FOREIGN PATENT DOCUMENTS

CN    104015930 A    9/2014
CN    104843189 A    8/2015
(Continued)

OTHER PUBLICATIONS

English translation of Search Report prepared by the Federal Service on Industrial Property in Russian Patent Application No. 2018130278 dated May 7, 2019.
(Continued)

*Primary Examiner* — Christopher P Jones
(74) *Attorney, Agent, or Firm* — McDonnell Boehnen Hulbert & Berghoff LLP

(57) ABSTRACT

An example ullage-recirculating catalytic inerting system includes: (i) a plurality of fuel tanks having (a) respective inert gas ports for discharging the inert gas within a respective fuel tank, and (b) respective ullage gas ports for drawing ullage gas from the respective fuel tank; and (ii) an inert gas generating system including (a) an ullage gas inlet port fluidly coupled to the respective ullage gas ports, (b) an inert gas outlet port fluidly coupled to the respective inert gas ports, (c) a catalytic reactor for chemically converting ullage gas received through the ullage gas inlet port to inert gas for discharge through the inert gas outlet port, and (d) a prime mover for moving gas through the inert gas generating system.

25 Claims, 8 Drawing Sheets

(51) Int. Cl.
*B01D 53/26* (2006.01)
*B01D 53/86* (2006.01)

(56) References Cited

U.S. PATENT DOCUMENTS

| | | | |
|---|---|---|---|
| 3,946,755 | A | 3/1976 | Ulanovsky |
| 6,585,192 | B2 | 7/2003 | Beers |
| 6,843,269 | B2 | 1/2005 | Verma et al. |
| 6,904,930 | B2 | 6/2005 | Susko |
| 7,459,081 | B2 | 12/2008 | Koenig et al. |
| 7,628,965 | B2 | 12/2009 | Johnson et al. |
| 7,694,916 | B2 | 4/2010 | Limaye et al. |
| 7,735,670 | B2 | 6/2010 | Zaki et al. |
| 7,896,292 | B2 | 3/2011 | Limaye et al. |
| 7,905,259 | B2 | 3/2011 | Johnson et al. |
| 8,313,061 | B2 | 11/2012 | Surawski |
| 8,602,362 | B2 | 12/2013 | Buchwald |
| 8,828,344 | B2 | 9/2014 | K-WLam et al. |
| 9,114,886 | B2 | 8/2015 | Gupta |
| 9,144,768 | B2 | 9/2015 | Tichborne et al. |
| 2005/0241700 | A1 | 11/2005 | Cozens et al. |
| 2012/0087807 | A1 | 4/2012 | Buchwald |
| 2012/0193479 | A1 | 8/2012 | Roscoe et al. |
| 2012/0325811 | A1 | 12/2012 | Hagh et al. |
| 2013/0000142 | A1 | 1/2013 | Tichborne et al. |
| 2014/0208943 | A1 | 7/2014 | Gupta |
| 2014/0252171 | A1* | 9/2014 | Dooley ............... B64D 37/32 244/129.2 |
| 2015/0034768 | A1 | 2/2015 | Hashimoto et al. |

FOREIGN PATENT DOCUMENTS

| | | |
|---|---|---|
| EP | 1 591 359 A1 | 11/2005 |
| GB | 653 667 A | 5/1951 |
| GB | 653667 | 5/1951 |
| JP | 2011-063259 | 3/2011 |
| RU | 86 171 U1 | 8/2009 |
| RU | 2 502 644 C2 | 12/2013 |
| WO | WO 2007/008730 A2 | 1/2007 |
| WO | WO 2011/117610 A1 | 9/2011 |

OTHER PUBLICATIONS

English translation of Office Action prepared by the Federal Service on Industrial Property in Russian Patent Application No. 2018130278 dated May 7, 2019.
Office Action prepared by the Canadian Office Action in Canadian Patent Application No. 3009976, dated Jun. 4, 2019.
Limaye, et al. Development of a 'Green' On-Board Inert Gas Generation System (GOBIGGS), Phyre Technologies, The Fifth Triennial International Fire & Cabin Safety Research Conference, Nov. 1, 2007.
Limaye, "Next Generation OBIGGS: Developments at Phyre Technologies" Presented at International Aircraft Systems Fire Protection Working Group Meeting, Nov. 2, 2005.
Wainright, et al. "Generation of Inerting Gases for Aircraft Fuel Tanks by Catalytic Combustion Techniques", Technical Report AFAPL-TR-69-68, vol. I, Aug. 1969.
Wainright, et al. "Generation of Inerting Gases for Aircraft Fuel Tanks by Catalytic Combustion Techniques", Technical Report AFAPL-TR-69-68, vol. II, Aug. 1969.
McDonald, et al. "Catalytic Reactor for Inerting of Aircraft Fuel Tanks", Prepared for Air Force Aero Propulsion Laboratory, AD/A-000 939, Jun. 1974.
Manatt, "Feasibility Study and Demonstration of Nitrogen Generation for Fuel Tank Inerting" Prepared for Federal Aviation Administration, AD-784,950, Jun. 1974.
Rousseau, et al., "Aircraft Fuel Tank Inerting by Catalytic Fuel Combustion", SAE International, Nov. 18, 2015.
Department of FAA, "Second Conference on Fuel System Fire Safety, Report of Conference", Engineering and Manufacturing Division Flight Standards Service, May 6-7, 1970.
Hamilton, "Aircraft Fuel Tank Inerting Program", Technical Report AFAPL-TR-70-83, vol. I, Jan. 1971.
Warner, et al, A Fuel Tank Inerting System for Military Aircraft, Technical Report AFAPL-TR-70-85, vol. I, Feb. 1971.
English Translation of Notice of Reasons for Rejection prepared by the Japanese Patent Office in Japanese Patent Application 2018-538114, dated Aug. 28, 2019.
First Office Action prepared by the Chinese Patent Office in Chinese Patent Application 201780007499.0, dated Jan. 18, 2021. English translation included.

* cited by examiner

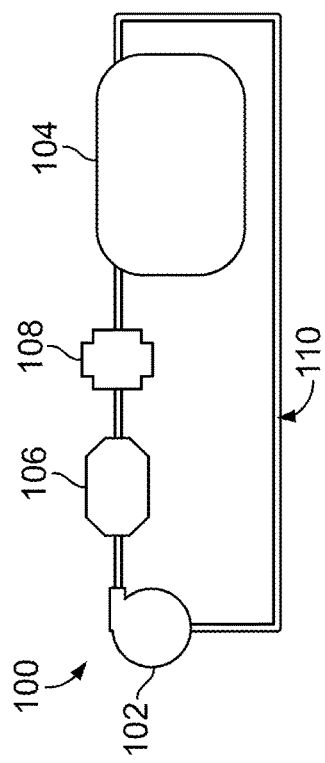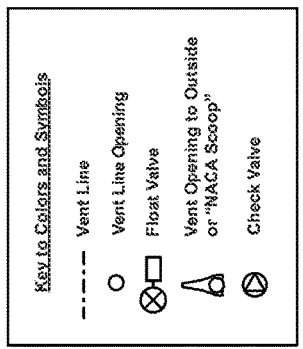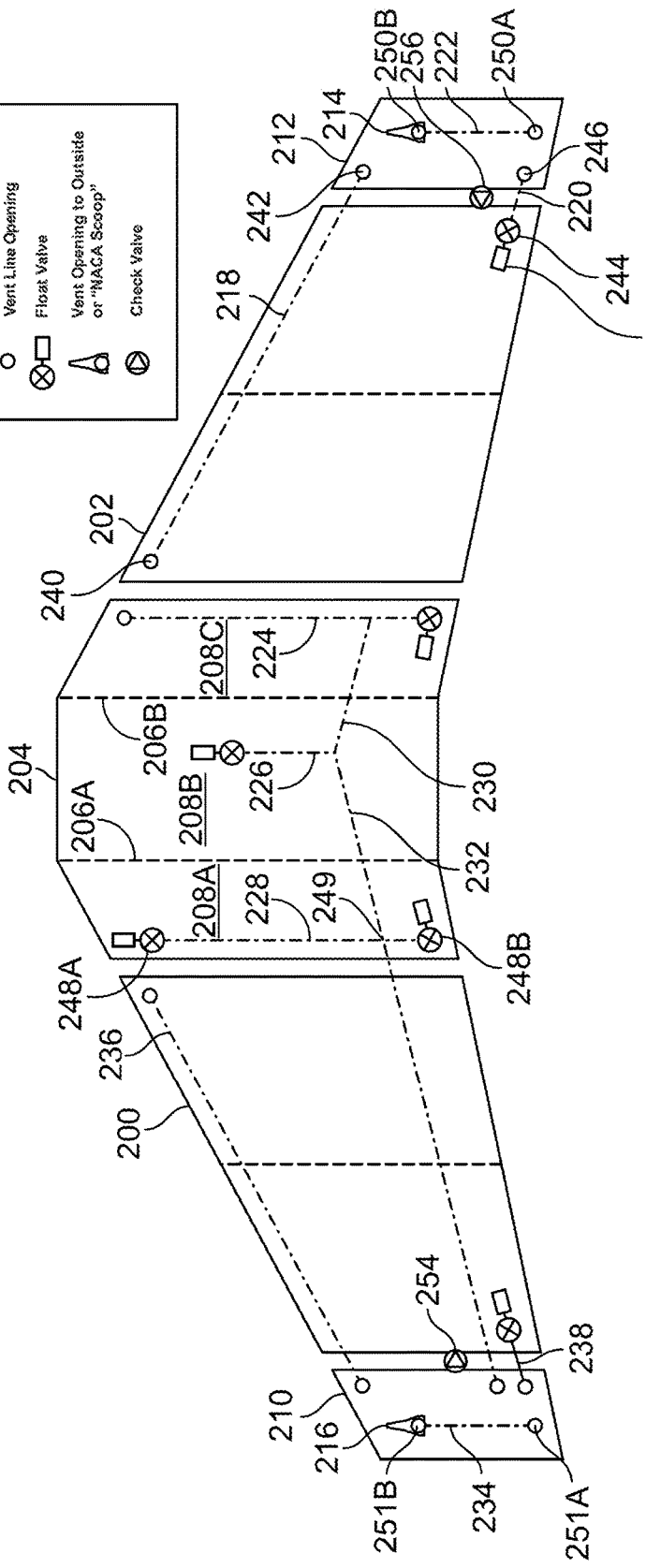

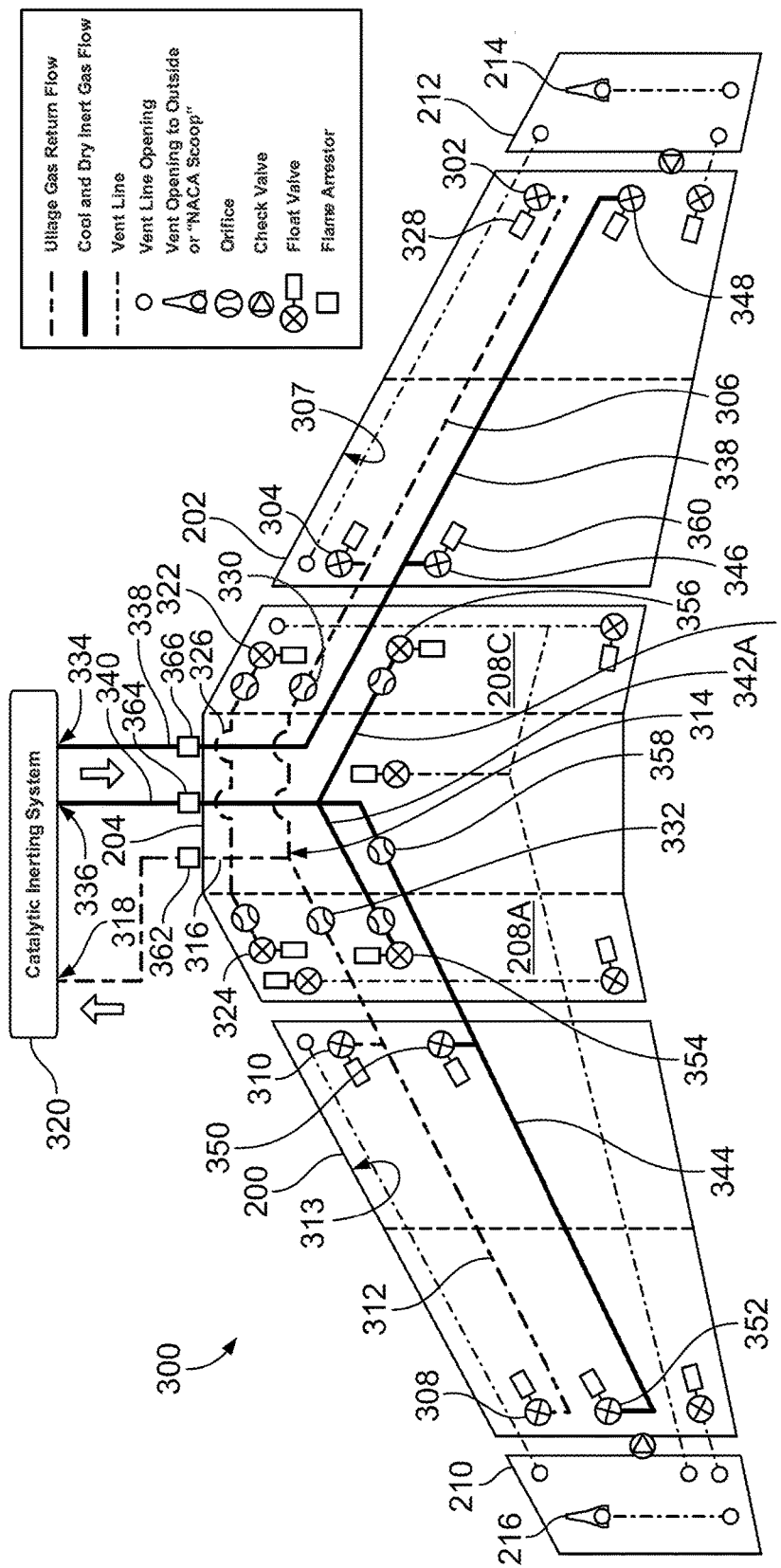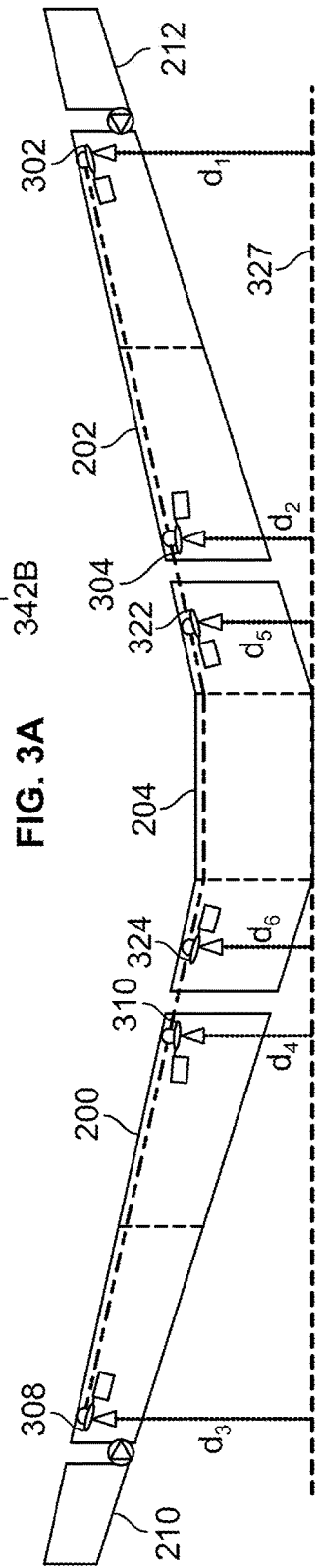
FIG. 3A
FIG. 3B

CATALYTIC INERTING SYSTEM FOR AN AIRCRAFT WITH MULTIPLE FUEL TANKS

CROSS REFERENCE TO RELATED APPLICATION

The present application claims priority to U.S. Provisional Application No. 62/281,757, filed on Jan. 22, 2016, and entitled: "Catalytic Inerting System for an Aircraft with Multiple Fuel Tanks," which is herein incorporated by reference as if fully set forth in this description.

BACKGROUND

A fuel tank is used in a vehicle to store fuel used for a propulsion system of the vehicle. Some of the fuel in the fuel tank may be converted from a liquid state to a gaseous state, and fuel vapor may thus form above the fuel in the fuel tank. The gas mixture above the liquid fuel in the fuel tank may be referred to as ullage gas, and may include a mixture of fuel vapor and air. The air may include oxygen, and therefore the ullage gas may be flammable under particular conditions. Therefore, it may be desirable to convert the ullage gas to an inert gas that is not flammable so as to preclude any fire hazard to the vehicle.

SUMMARY

The present disclosure describes implementations that relate to a catalytic inerting system for an aircraft with multiple fuel tanks. In a first example implementation, the present disclosure describes an ullage-recirculating catalytic inerting system. The ullage-recirculating catalytic inerting system includes: (i) a plurality of fuel tanks having (a) respective inert gas ports for discharging the inert gas within a respective fuel tank, and (b) respective ullage gas ports for drawing ullage gas from the respective fuel tank, where at least one fuel tank of the plurality of fuel tanks includes a plurality of ullage gas ports disposed therein at different locations that correspond to respective high points of the at least one fuel tank during respective phases of flight of the aircraft; and (ii) an inert gas generating system including (a) an ullage gas inlet port fluidly coupled to the respective ullage gas ports, (b) an inert gas outlet port fluidly coupled to the respective inert gas ports, (c) a catalytic reactor for chemically converting ullage gas received through the ullage gas inlet port to inert gas for discharge through the inert gas outlet port, and (d) a prime mover for moving gas through the inert gas generating system.

In a second example implementation, the present disclosure describes an ullage-recirculating catalytic inerting system. The ullage-recirculating catalytic inerting system includes: (i) a plurality of fuel tanks having (a) respective inert gas ports for discharging the inert gas within a respective fuel tank, and (b) respective ullage gas ports for drawing ullage gas from the respective fuel tank; and (ii) an inert gas generating system including (a) an ullage gas inlet port fluidly coupled to the respective ullage gas ports, (b) an inert gas outlet port fluidly coupled to the respective inert gas ports, (c) a catalytic reactor for chemically converting the ullage gas received through the ullage gas inlet port to inert gas for discharge through the inert gas outlet port, and (d) at least two prime movers: a first prime mover for moving gas through the inert gas generating system and providing the inert gas to a first subset of fuel tanks of the plurality of fuel tanks, and a second prime mover for moving gas through the inert gas generating system and providing the inert gas to a second subset of fuel tanks of the plurality of fuel tanks.

In a third example implementation, the present disclosure describes an ullage-recirculating catalytic inerting system. The ullage-recirculating catalytic inerting system includes: (i) a plurality of fuel tanks having (a) respective inert gas ports for discharging the inert gas within a respective fuel tank, and (b) respective fuel tank ullage gas ports and plumbing network for drawing ullage gas from the respective fuel tank and providing the ullage gas to a surge tank of a plurality of surge tanks fluidly coupled to the plurality of fuel tanks; and (ii) an inert gas generating system including (a) an ullage gas inlet port, (b) an inert gas outlet port fluidly coupled to the respective inert gas ports, (c) a catalytic reactor for chemically converting the ullage gas received through the ullage gas inlet port to inert gas for discharge through the inert gas outlet port, and (d) a prime mover for moving gas through the inert gas generating system. Each surge tank of the plurality of surge tanks includes: (a) a vent opening to communicate fluids to and from an ambient environment of the aircraft, and (b) a first ullage gas port for receiving the ullage gas from the respective fuel tank, and (c) a second ullage gas port for drawing the ullage gas and providing the ullage gas to the ullage gas inlet port of the inert gas generating system.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

FIG. 1 illustrates an ullage-recirculating catalytic inerting system, in accordance with an example implementation.

FIG. 2 illustrates a schematic plan or top view of aircraft wings divided into three fuel tanks and having two vent openings, in accordance with an example implementation.

FIG. 3A illustrates a plan view of an ullage-recirculating inerting system, in accordance with an example implementation.

FIG. 3B illustrates a partial rear view of the ullage-recirculating inerting system of FIG. 3A, in accordance with an example implementation.

DETAILED DESCRIPTION

Figure 4:
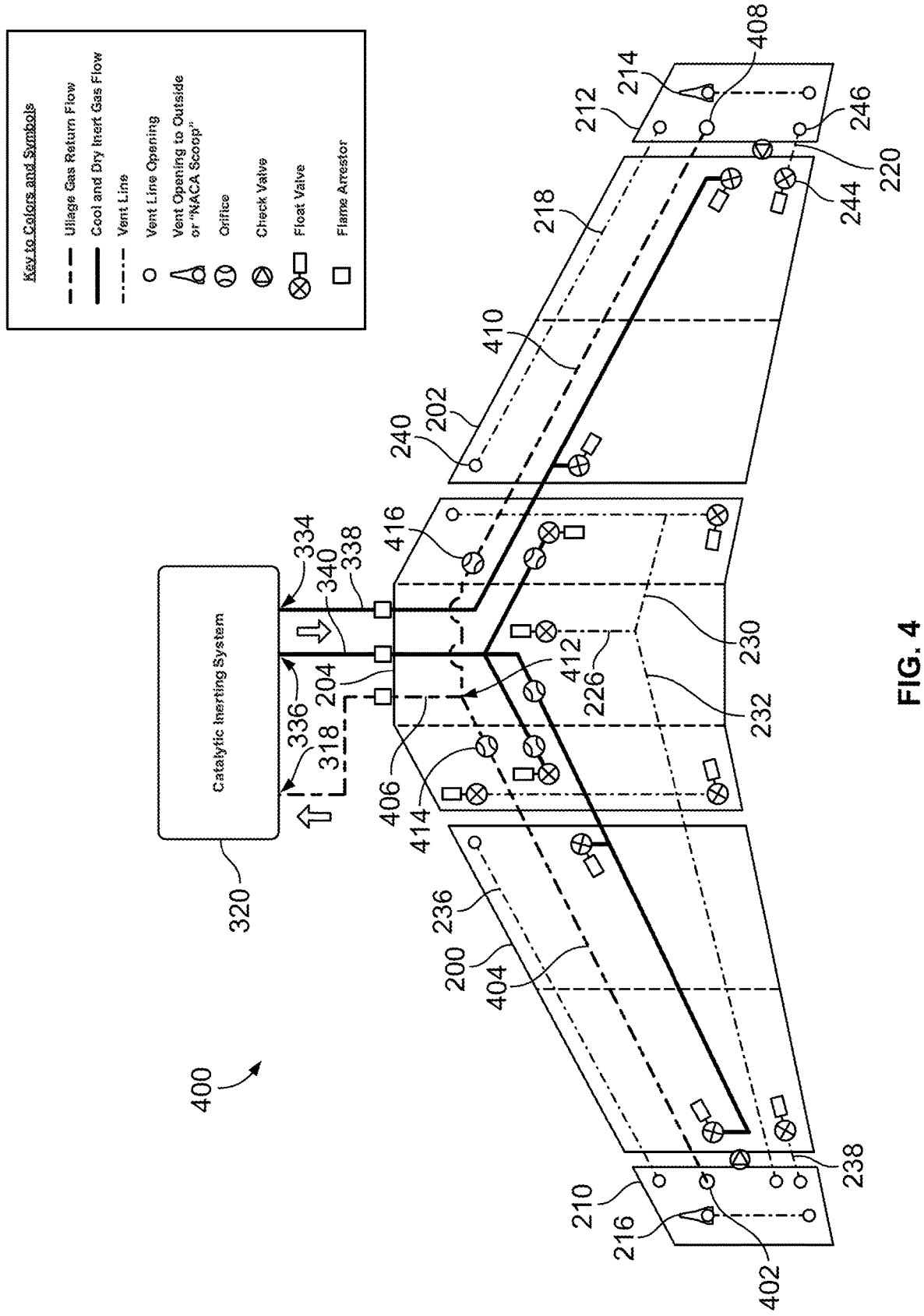
FIG. 4 illustrates a plan view of an ullage-recirculating inerting system for removing ullage gas from surge tanks, in accordance with an example implementation.

To prevent fires or hazards associated with an ullage gas mixture disposed in an empty space of a fuel tank above the liquid fuel surface, the ullage gas may be inerted. For example, high pressure nitrogen-rich air could be generated and injected in the fuel tanks to displace the oxygen in the ullage gas. As the nitrogen-enriched gas enters the fuel tank, an equivalent volume of the gas residing in the ullage space flows overboard (e.g., out of the fuel tank or a vehicle containing the fuel tank). As this process continues, the nitrogen-enriched gas displaces the oxygen-containing gas in the ullage space thereby reducing the oxygen concentration in the ullage space and effectively inerting the fuel tank.

For example, high pressure air could be generated or extracted from an engine of an aircraft and supplied to an air separation module (ASM)-based inerting system via a pneumatic system. In an example, the pressurized air could be bleed air from the engine. In this example, the inerting system may be configured to continuously generate nitrogen-enriched air to displace the gases in the ullage space and effectively reduce the oxygen concentration therein. However, consuming bleed air from the engine may affect performance of the engine, and may also reduce efficiency of the engine because of the energy spent in generating the pressurized air. Additionally, obtaining bleed air from engines can be particularly burdensome for an aircraft powered by engines that have little or no bleed air available, such as turboshafts (as used on helicopters), small turbofans (as used on business jets), and turboprops (as used on short-haul transports).

Also, some vehicles are designed with no access to bleed air. For instance, on some aircraft systems, electric compressors are used to generate pressurized air for the pneumatic system of the aircraft, but no bleed air might be available for the inerting system. Therefore, it is desirable in some applications to have an inerting system that does not consume pressurized bleed air from the engine. Catalytic inerting avoids using bleed air from engines.

FIG. 1 illustrates an ullage-recirculating catalytic inerting system 100, in accordance with an example implementation. The system 100 may include via a prime mover 102 (e.g., a blower or a pump) configured to draw potentially-flammable ullage gas from a fuel tank 104 and return it back to the fuel tank 104 in a non-flammable state. The ullage gas includes a mixture of fuel vapor and air as mentioned above, and the air includes oxygen. An objective of the system 100 is to remove or reduce the level of oxygen in the ullage gas to inert it and return it to the fuel tank 104 in an inerted state, thus reducing any risk of fires or explosions.

Particularly, the system 100 may be configured to process the ullage gas through a catalytic reactor 106 where the oxygen and fuel vapor present in the ullage gas chemically react and produce relatively inert chemical elements, such as carbon dioxide and water vapor. In this manner, the system 100 reduces oxygen concentration in the ullage gas. Nitrogen, which could be the largest component of the ullage gas, is inert and does not participate in the reaction between the fuel vapor and air.

Because water may be undesirable in a fuel tank, most of it could be removed from the generated inert gas before it is returned to the fuel tank. The system 100 may thus further include a heat exchanger 108 configured to cool and dry the reacted ullage gas resulting from the catalytic reactor 106 to condense the water therein and remove it. In this state, the ullage gas may be non-flammable, and might not sustain a fire, and is returned by the system 100 back to the fuel tank.

A plumbing network 110 connects the various components of the system 100 and is configured to transport the ullage gas therebetween. As depicted in FIG. 1, the system 100 is a closed loop system of ullage gas, and no separate bleed air is used. Therefore, the system 100 may increase efficiency of an engine of the vehicle because no bleed air is consumed. Also, the system 100 can be used in vehicles that might not have bleed air available.

Some vehicles may include multiple fuel tanks, as opposed to a single container of fuel, thus rendering an inerting gas system more complex. The fuel tanks may be configured to provide fuel to multiple engines that drive the vehicle. As an example, a commercial aircraft may include multiple fuel tanks coupled to a fuselage and wings of the aircraft. The multiple fuel tanks may have internal partitions and interconnecting vent systems, which increases the complexity of the inerting system.

Disclosed herein are example ullage-recirculating catalytic inerting systems that do not consume bleed air and are configured to take into consideration the complexity of a multiple fuel tank system. An aircraft is used herein as an example vehicle with multiple fuel tanks; however, the disclosed systems could be used for other vehicles as well. Further, an aircraft with a first side fuel tank, a second side fuel tank, and a center fuel tank is used as an example configuration. The systems and methods described herein could be used with an aircraft having two side fuel tanks without a center fuel tank or any other configuration.

FIG. 2 illustrates a schematic plan or top view of aircraft wings divided into three fuel tanks and having two vent openings, in accordance with an example implementation. An example aircraft may be configured to carry most or all of its fuel in the wings, and therefore, the shape of the fuel tanks mimics that of the wings. This configuration is used herein as an example, and the inerting systems disclosed can be applied to an aircraft with fewer or more fuel tanks.

The aircraft may include a first (e.g., left) fuel tank 200 coupled to a first wing coupled to one side of a fuselage of the aircraft, a second (e.g., right) fuel tank 202 coupled to a second wing of the aircraft coupled to the other side of the fuselage, and a center fuel tank 204, which abuts each of the fuel tanks 200 and 202 and passes through or is coupled to the fuselage of the aircraft. In examples, the fuel tanks 200, 202, and 204 could be internally partitioned into several compartments. In FIG. 2, the three fuel tanks 200, 202, and 204 are outlined in solid lines, whereas structural partitions therein are shown as dashed lines. For instance, dashed lines 206A and 206B divide the center fuel tank 204 into three tanks 208A, 208B, and 208C. The outboard tanks 208A and 208C could be referred to as "cheek tanks."

In examples, fuel could be pumped from the center fuel tank 204 to the fuel tanks 200 and 202, and from the fuel tanks 200 and 202 into the engines. At the end of each wing is a surge tank. For example, a surge tank 210 is disposed adjacent, or is coupled, to the fuel tank 200, and a surge tank 212 is disposed adjacent, or is coupled, to the fuel tank 202. The fuel tanks 200, 202, and 204 are shown schematically in FIG. 2 as being separate; however, in example implementations, bulkheads are disposed between each two adjacent fuel tanks. Similarly, bulkheads could be disposed between the fuel tank 200 and the surge tank 210, and between the fuel tank 202 and the surge tank 212.

The surge tanks 210 and 212 may include vent openings 214 and 216 that fluidly couple the fuel tanks 200, 202, and 204 to an ambient environment of the aircraft. The fuel tanks 200, 202, and 204 are vented to the ambient environment of the aircraft through the vent openings 214 and 216 to allow the fuel tanks 200, 202, and 204 to "breathe." This way, the pressure differential between the inside of the fuel tanks 200, 202, and 204 and the ambient environment of the aircraft may be maintained at an acceptably low level.

Particularly, as the aircraft climbs or ascends, the pressure of the ambient environment decreases. Thus, to equalize or balance the pressure levels, ullage gas above the liquid fuel surface level within the fuel tanks 200, 202, and 204 may flow through vent lines to the surge tanks 210 and 212. For example, ullage gas in the fuel tank 202 may flow through vent lines 218 and 220 to the surge tank 212. The ullage gas may then flow through vent line 222 in the surge tank 212 and exit through the vent opening 214 to the ambient environment, which has a lower pressure level than the ullage gas.

Similarly, ullage gas in the center fuel tank 204 may flow through vent lines 224, 226, and 228 and may be combined through vent lines 230 and 232 to flow to the surge tank 210. The ullage gas may then flow from the surge tank 210 through vent line 234 and the vent opening 216 to the ambient environment to equalize the pressure levels. In a similar manner, ullage gas in the fuel tank 200 may flow through vent lines 236 and 238 to the surge tank 212. The ullage gas may then flow through the vent line 234 and exit through the vent opening 216 to the ambient environment to equalize the pressure levels.

Conversely, when the aircraft descends, the increasing pressure of the ambient environment causes ambient air to enter through the vent openings 214 and 216 and the respective vent lines to the fuel tanks 200, 202, and 204. This inflow of ambient air re-pressurizes the surge and fuel tanks; otherwise, the pressure differential might cause the wings to collapse.

For instance, ambient air may flow through the vent lines 222 and vent lines 218 and 220 to enter the fuel tank 202. Ambient air could also flow through the vent lines 234 and the vent line 232 to enter to the center fuel tank 204. Similarly, ambient air could flow through the vent line 234 and vent lines 236 and 238 to the fuel tank 200. The ambient air then pressurizes the ullage space above the liquid fuel surface level within the fuel tanks 200, 202, and 204. In this manner, the vent openings 214 and 216 facilitate equalizing or balancing pressure levels between the inside of the fuel tanks 200, 202, and 204 and the ambient environment of the aircraft during various phases of flight of the aircraft.

In the configuration shown in FIG. 2, there are three fuel tanks 200, 202, and 204 and two vent openings 214 and 216. The center fuel tank 204 and the fuel tank 200 share a common vent system, while the fuel tank 202 has its own vent system. Particularly, the vent lines 224 and 228 of the center fuel tank 204 join the vent lines 230 and 232 to communicate ullage gas to the surge tank 210. Also, ullage gas from the fuel tank 200 is also communicated through the vent lines 236 and 238 to the surge tank 210.

This configuration of fuel tanks and vent lines is one possible arrangement of vent plumbing, which allows ullage gas, fuel, and ambient air to move within the fuel tanks 200, 202, 204 and across tank boundaries to and from the surge tanks 210 and 212. However, other arrangements are possible. For example, the center fuel tank 204 may have a common vent system with the fuel tank 202. In another example, each of the fuel tanks 200, 202, and 204 may be connected to its own surge tank and vent opening.

As depicted in FIG. 2, each of the vent lines may have a vent inlet port(s) through which ullage gas enters a respective vent line, and may have a vent outlet port through which the ullage gas leaves the respective vent line. For example, the vent line 218 has a vent inlet port 240 at a first end thereof within the fuel tank 202 and a vent outlet port 242 at a second end of the vent line 218 within the surge tank 212. Similarly, the vent line 220 has a vent inlet port 244 at a first end thereof within the fuel tank 202 and a vent outlet port 246 at a second end of the vent line 220 within the surge tank 212.

As depicted in FIG. 2, the other vent lines also have at least one respective vent inlet port and a vent outlet port. The vent line 228 may have two vent inlet ports 248A and 248B at either end thereof to receive the ullage gas and communicate it to a junction 249 with the vent line 232.

Also, the vent line 222 may have a vent inlet port 250A through which the ullage gas delivered to the surge tank 212 enters the vent line 222, and a vent outlet port 250B coupled to the vent opening 214 for discharging the ullage gas thereto. Similarly, the vent line 234 may have a vent inlet port 251A through which the ullage gas delivered to the surge tank 210 enters the vent line 234, and a vent outlet port 251B coupled to the vent opening 216 for discharging the ullage gas thereto.

Further, as shown in FIG. 2, the vent lines are shown near (e.g., within a threshold distance from) the forward and rear boundaries of the fuel tanks 200 and 202. For instance, the vent line 218 is located near a forward boundary of the fuel tank 202, whereas the vent line 220 is located near a rear boundary thereof. Similarly, the vent line 236 is located near a forward boundary of the fuel tank 200, whereas the vent line 238 is located near a rear boundary thereof.

This configuration of vent lines may account for the movement of the ullage bubble during various phases of flight and different flight conditions. Example low-wing aircrafts may have dihedral wings configured to slant upward from the wing root, where the wing couples to the fuselage, toward the wingtip. The fuel tanks 200, 202, and 204 may be configured and geometrically shaped similar to the respective wings containing them. As such, the fuel tank 200 may have a geometry that is angled from a root of a wing toward a tip of the wing, and the fuel tank 202 has a geometry that is angled from a respective root of a respective wing toward a respective tip of the respective wing.

As a result of the dihedral geometry, when an aircraft is loaded with fuel and sitting on the ground, the high point of the fuel tanks 200 and 202 where the ullage gas bubbles may be located might be at the wingtip. For the center fuel tank 204, the high points may be located at the outboard portions thereof, which may reside outside the boundary of the fuselage, e.g., within the cheek tanks 208A and 208C. As the aircraft pitches nose up during a climb-out, the ullage bubble may move from the wingtips inboard to the forward most point in the wings near the roots of the wings.

The vent lines configuration shown in FIG. 2 facilitates maintaining communication of the ullage spaces within the fuel tanks 200, 202, and 204 with the surge tanks 210 and 212 regardless of where the ullage bubbles are and in which phase of flight the aircraft is operating. Particularly, communication is maintained whether the ullage bubbles are at the outboard ends of the fuel tanks 200, 202, and 204 or at the inboard points at the forward boundaries thereof. For example, the vent inlet port 244 is located at an outboard end of the fuel tank 202, whereas the vent inlet port 240 is located at the forward boundary of the fuel tank 202 at an inboard end thereof. With this configuration, the ullage gas within the fuel tank 202 may be scavenged and communicated to the surge tank 212 for venting whether the aircraft is sitting on the ground or cruising, or climbing up.

In examples, when the aircraft is pitched nose up during climbing, liquid fuel could unintentionally flow through the rear vent lines to the surge tanks (e.g., migrate from the vent inlet port 244 through the vent line 220 to the surge tank 212). To control or preclude flow of fuel through the vent lines, float valves could be installed at the vent inlet ports of the rear vent lines. For example, a float valve 252 is located at the vent inlet port 244 of the vent line 220 within the fuel tank 202. As depicted in FIG. 2, other float valves, similar to the float valve 252, could be installed at rear vent lines in the other fuel tanks as well. When a float valve such as the float valve 252 is under fuel, the float valve closes, thereby preventing unwanted fuel transfer from the fuel tanks 200, 202, and 204 to the surge tanks 210 and 212.

In examples, the surge tanks 210 and 212 communicate with the fuel tanks 200, 202, and 204, but they may remain dry with no appreciable fuel therein. Liquid fuel can be present in the surge tanks 210 and 212 under certain extreme or failure conditions. For example, if a shutoff valve were to fail during an aircraft refueling process, fuel might exit the fuel tanks 200, 202, and 204 once they became full of liquid fuel and flow to the surge tanks 210 and 212 through the vent lines. Spilling of the fuel from into the surge tanks 210 and 212 may vary with fuel tank capacity, pitch, roll, yaw, and accelerations experienced by the fuel. As an example, for a level, stationary aircraft, spilling could occur approximately between 97% and 98% of capacity of the fuel tanks 200 and 202. When the surge tanks 210 and 212 become sufficiently filled, liquid fuel may spill out of the vent openings 214 and 216. Allowing fuel to exit the fuel tanks 200, 202, and 204 under these conditions may prevent them from becoming over-pressurized.

In examples, check valves 254 and 256 may be mounted in the bulkheads between the surge tanks 210 and 212 and their adjacent fuel tanks 200 and 202, respectively. The check valves 254 and 256 may prevent fuel in the fuel tanks 200 and 202 from entering the surge tanks 210 and 212 under normal operating conditions. The check valves 254 and 256 may also allow any fuel that may have made its way into the surge tanks 210 and 212 to drain back into the fuel tanks 200 and 202 when the fuel level in the fuel tanks 200 and 202 drops below the level of the check valves 254 and 256. This way, the fuel is precluded from being trapped in the surge tanks 210 and 212 or going overboard. In examples, the check valves 254 and 256 may include flapper-type valves that have a low cracking pressure.

The multiplicity of internally compartmentalized fuel tanks such as the fuel tanks 200, 202, and 204 coupled by interconnecting vent systems and the different conditions encountered during various flight phases renders complexity to designing an ullage-recirculating inerting system. Disclosed next are ullage-recirculating inerting systems that take into account such complexity of fuel tank architecture. The disclosed systems also take into consideration the different conditions encountered during various flight phases if the multiple fuel tank system is used in an aircraft.

The aircraft may have different orientations and inertial loading conditions depending on the flight phase in which the aircraft is operating. Example operational phases, part of nearly every flight segment, include preflight, engine taxi out, take-off, climb-out, cruise, descent, approach, landing, taxi-in, engine shut-down, and post-flight. The orientation and inertial loading affect the location of the high point within a fuel tank. The locations of the high points within the fuel tanks may be similar in a subset of these flight phases, but may differ for other flight phases. As an example, when a low-wing aircraft is sitting on the ground, taxiing, or cruising, the high point in the wing fuel tank may be located at the wingtip. During climb-out, the aircraft is pitched nose up and the bubble of ullage gas can move from the wingtip to the forward portion of the tank near the wing root. The systems disclosed herein are configured to accommodate such variation in the location of the high point.

FIG. 3A illustrates a plan view of an ullage-recirculating inerting system 300, and FIG. 3B illustrates a partial rear view of the ullage-recirculating inerting system 300, in accordance with an example implementation. The fuel tanks 200, 202, and 204 of the system 300 may include ullage gas ports for drawing ullage gas from the respective fuel tank. The ullage gas ports are disposed at different locations within a respective fuel tank to accommodate variation of location of the high points during various phases of flight of the aircraft.

For example, the fuel tank 202 includes ullage gas ports 302 and 304 coupled to an ullage gas line 306. The ullage gas port 302 is located near (e.g., within a threshold distance from) the wingtip of the wing containing the fuel tank 202. Thus, the ullage gas port 302 may be configured to scavenge or draw ullage gas from the fuel tank 202 when the aircraft is sitting on the ground or cruising. The ullage gas port 304 is located near (e.g., within a threshold distance from) the wing root and near (e.g., within a threshold distance from) a forward boundary 307 of the fuel tank 202 or a forward boundary of the wing containing it. Thus, the ullage gas port 304 may be configured to scavenge or draw ullage gas from the fuel tank 202 during climb-out of the aircraft. The threshold distances could range from an inch up to several feet depending on the type of fuel tank and aircraft.

Similarly, the fuel tank 200 includes ullage gas ports 308 and 310 coupled to an ullage gas line 312. The ullage gas port 308 is located near (e.g., within a threshold distance from) the wingtip of the wing containing the fuel tank 200. Thus, the ullage gas port 308 may be configured to scavenge or draw ullage gas from the fuel tank 200 when the aircraft is sitting on the ground or cruising. The ullage gas port 310 is located near (e.g., within a threshold distance from) the wing root and near (e.g., within a threshold distance from) a forward boundary 313 of the fuel tank 200 or a forward boundary of the wing containing it. Thus, the ullage gas port 310 may be configured to scavenge or draw ullage gas from the fuel tank 200 during climb-out of the aircraft.

The ullage gas lines 306 and 312 combine at a junction 314, and then an ullage gas line 316 communicates the ullage gas to an ullage gas inlet port 318 of a catalytic inerting system 320. The catalytic inerting system 320 may, for example, be similar to the system 100 depicted in FIG. 1.

The center fuel tank 204 includes ullage gas port 322 and 324 coupled to an ullage gas line 326. The ullage gas port 322 is located near an outboard boundary of the cheek tank 208C, and the ullage gas port 324 is located near an outboard boundary of the cheek tank 208A. The ullage gas drawn by the ullage gas ports 322 and 324 is communicated through the ullage gas line 326 to the ullage gas line 316, then to the ullage gas inlet port 318 of the catalytic inerting system 320.

Due to the dihedral design of the wings of an aircraft and the associated dihedral geometry of the fuel tanks 200, 202, and 204, the ullage gas ports are disposed at different distances from an underbelly of the aircraft or from a bottom surface 327 of the center fuel tank 204. For example, referring to FIG. 3B, the ullage gas port 302 is disposed at a distance "$d_1$" from the bottom surface 327, whereas the ullage gas port 304 is disposed at a distance "$d_2$" from the bottom surface 327, where $d_2$ is less than $d_1$.

Similarly, the ullage gas port 308 is disposed at a distance "$d_3$" from the bottom surface 327, whereas the ullage gas port 310 is disposed at a distance "$d_4$" from the bottom surface 327, where $d_4$ is less than $d_3$. In examples, $d_1$ may be equal to $d_3$ and $d_2$ may be equal to $d_4$; however, in other examples, the distances may be different. The ullage gas port 322 is disposed at a distance "$d_5$" from the bottom surface 327, whereas the ullage gas port 324 is disposed at a distance "$d_6$" from the bottom surface 327. In examples, $d_5$ may be equal to $d_6$; however, in other examples, the distances may be different. Also, $d_5$ and $d_6$ may be less than $d_4$ and $d_2$. Wings with dihedral design are used herein as an example for illustration only. The systems and methods disclosed herein could be applied to wings with an anhedral design or straight wings.

In examples, in order to prevent liquid fuel from entering through an ullage gas port that might be submerged in fuel under certain conditions, a float valve could be installed at the ullage gas port. For example, a float valve 328 may be coupled to the ullage gas port 302. Similar float valves could be coupled to the other ullage gas ports as well as depicted in FIG. 3A. A float valve closes when it is below the liquid fuel surface level, and may thus prevent liquid fuel from entering a respective ullage gas port.

In some examples, flow control orifices could be mounted within the ullage gas lines to allocate proper relative amounts of ullage gas flow from the fuel tanks 200, 202, and 204 to the catalytic inerting system 320. For example, a flow control orifice 330 may be included in the ullage gas line 306 to cause a pressure drop therein. Similarly, a flow control orifice 332 may be included in the ullage gas line 312 to cause a pressure drop therein. By sizing the flow control orifices 330 and 332, particular pressure drops thereacross could be achieved, and the amount of flow rate in their respective ullage gas lines can be controlled. The flow control orifices 330 and 332 could be fixed orifices, or could be variable orifices. In an example, each flow control orifice such as the flow control orifices 330 and 332 could be an electronically controlled valve. In this example, the pressure drops across the flow control orifices 330 and 332 could be electronically controlled via signals from a controller of the system 300.

The catalytic inerting system 320 may include a prime mover (e.g., a blower similar to the prime mover 102) configured to draw the ullage gas through the ullage gas line 316 from the various ullage gas ports in the fuel tanks 200, 202, and 204. The prime mover also pushes the ullage gas through a catalytic reactor (e.g., the catalytic reactor 106) and a heat exchanger (e.g., the heat exchanger 108). The resulting gas from the heat exchanger is inert, cool, and dry gas that the prime mover discharges back to the fuel tanks 200, 202, and 204 to complete the cycle or recirculation of the gas.

As shown in FIG. 3A, the catalytic inerting system 320 may have one or more inert gas outlet ports such as inert gas outlet ports 334 and 336 through which the inert gas is discharged to inert gas lines 338 and 340, respectively. The inert gas line 338 extends to the fuel tank 202 and provides the inert gas thereto. The inert gas line 340 branches into three inert gas lines 342A, 342B, and 344. The inert gas lines 342A and 342B provide the inert gas to the fuel tank 204, whereas the inert gas line 344 extends to the fuel tank 200 to provide inert gas thereto.

In examples, the system 300 is configured such that the inert gas is delivered to the high points in the respective fuel tanks. For example, the fuel tank 202 may have inert gas port 346 at an inboard location near (e.g., within a threshold distance from) the ullage gas port 304. The fuel tank 202 may also have inert gas port 348 at an outboard location at the wingtip near (e.g., within a threshold distance from) the ullage gas port 302. Similarly, the fuel tank 200 may have inert gas port 350 at an inboard location near (e.g., within a threshold distance from) the ullage gas port 310, and may also have inert gas port 352 at an outboard location at the wingtip near (e.g., within a threshold distance from) the ullage gas port 308. The fuel tank 204 may also have inert gas ports 354 and 356 at the cheek tanks 208A and 208C, respectively, to discharge the inert gas therein. In examples, the threshold distances may be based on a volume and shape of ullage bubbles under particular conditions.

Similar to the ullage gas lines, the inert gas lines may include flow control orifices to facilitate proper apportioning of inert gas flow to each of the fuel tanks 200, 202, and 204. For example, the inert gas line 344 may include a flow control orifice 358. Other inert gas lines may include flow control orifices as depicted in FIG. 3A.

In some examples, the system 300 is configured to discharge the inert gas in the ullage space above the liquid fuel surface level in the fuel tanks 200, 202, and 204. In these examples, float valves may be coupled to the inert gas ports to allow the inert gas ports to be open when the fuel level is below the inlet gas ports and to prevent liquid fuel from entering the inlet gas ports when the inlet gas ports are under fuel. For instance, a float valve 360 may be coupled to the inert gas port 346 of the fuel tank 202. Float valves could be coupled to the other inert gas ports as shown in FIG. 3A.

Also, in these examples, the prime mover (e.g., blower) of the catalytic inerting system 320 supplies the inert gas at a sufficient pressure to overcome pressure losses in the ullage recirculating plumbing network (i.e., flow losses in the inert gas lines). As an example, the prime mover may provide the inert gas at a pressure less than 1 pound per square inch (psi) to be able to discharge the inert gas to the ullage space above the liquid fuel in a respective fuel tank.

However, in other examples, a high pressure prime mover (e.g., high pressure blower) may be desired. For example, it may be desirable to discharge the inert gas below the surface of the fuel in a respective fuel tank, and let the inert gas bubbles climb through the fuel to the surface. In this example, the prime mover may supply the inert gas at a sufficiently high pressure to overcome the pressure of the fuel at the discharge location of the inert gas. The pressure at the discharge location may be based on the amount or height of fuel in the tank above the discharge location and the density of the fuel. As an example, if the surface level of the fuel is at a height "h" from the discharge location and the density of the fuel is "$\rho$," then the pressure "P" at the discharge location may be determined as $P=\rho gh$, where "g" is the gravitational or inertial acceleration. The blower may then supply the inert gas at a pressure larger than "P."

An advantage of discharging the inert gas below the fuel surface is that the inert gas could be discharged into many more regions within a respective fuel tank rather than or in addition to the high points. This configuration may enable architecture enhancement of the system 300 and using fewer components in the respective fuel tank (e.g., no float valves).

Also, a high pressure prime mover may enable discharging the inert gas at or near the bottom of a respective fuel tank. This way, the inert gas may travel through a long path through the liquid fuel before reaching the ullage space above the fuel surface level in the respective fuel tank. With this configuration, some fuel vapor may be entrained and liberated from the free surface of the fuel into the ullage space, thus enabling the system 300 to perform better at low fuel temperature conditions.

In another example, the high pressure prime mover may be configured to discharge or blow high pressure inert gas across the fuel free surface to liberate fuel vapor from the liquid fuel. This configuration may enable the system 300 to perform better at low fuel temperature conditions.

In some example, the system 300 may include flame arrestors to prevent a reaction front from leaving the catalytic reactor of the catalytic inerting system 320. For example, a flame arrestor 362 may be coupled to the ullage gas line 316, a flame arrestor 364 may be coupled to the inert gas line 340; and a flame arrestor 366 may be coupled to the inert gas line 338. In examples, the flame arrestors 362, 364, and 366 may include solid state devices with no moving parts and may have a honeycomb-shaped grid therein that quenches a reaction front that might be moving through a line to stop propagation of a chemical reaction. The flame arrestors 362, 364, and 366 are intrinsically safe, and will not allow any reaction front to be propagated to the fuel tanks 200, 202, and 204 from the chemical reaction taking place at the catalytic reactor of the catalytic inerting system 320.

As described above with respect to FIG. 2, the fuel tanks 200, 202, and 204 may have a vent system that allows the pressure therein to be balanced with the ambient pressure or controlled to some pressure relative to the ambient pressure. As mentioned above, when an aircraft is climbing from the ground to cruise altitude, the pressure in the ambient environment of the aircraft decreases. In order to maintain the least pressure differential between the ambient environment and the inside of the fuel tanks 200, 202, and 204, the vent system allows the ullage gas from the fuel tanks 200, 202, and 204 to the surge tanks 210 and 212. The ullage gas then flows overboard (e.g., discharged to the ambient environment) through the vent openings 214 and 216 to maintain the pressure inside the fuel tanks 200, 202, and 204 close to that of the ambient environment.

With this configuration, the vent system is configured to move the ullage gas in the fuel tanks 200, 202, and 204 to the surge tanks 210 and 212. Thus, the surge tanks 210 and 212 make a desirable location from which the ullage gas could be drawn to a catalytic inerting system (e.g., the catalytic inerting system 320).

FIG. 4 illustrates a plan view of an ullage-recirculating inerting system 400 for removing ullage gas from the surge tanks 210 and 212, in accordance with an example implementation. The vent system (e.g., vent lines 218, 220, 226, 230, 232, 236, and 238 and the vent ports coupled thereto) transfer ullage gas the fuel tanks 200, 202, and 204 to the surge tanks 210 and 212. The system 400 may have ullage gas ports disposed in the surge tanks 210 and 212 to draw the ullage gas transferred thereto through the vent system.

For example, the system 400 may include an ullage gas port 402 disposed in the surge tank 210. The ullage gas received at the ullage gas port 402 may be drawn through an ullage gas line 404 and ullage gas line 406 to the ullage gas inlet port 318 of the catalytic inerting system 320.

Similarly, the system 400 may include an ullage gas port 408 disposed in the surge tank 212. The ullage gas received at the ullage gas port 408 may be drawn through an ullage gas line 410 to combine at a junction 412 with the ullage gas in the ullage gas line 404 and flow through the ullage gas line 406 to the ullage gas inlet port 318 of the catalytic inerting system 320. Similar to the system 300 shown in FIG. 3A, flow control orifices 414 and 416 could be included in the ullage gas lines 404 and 410, respectively, to facilitate proper relative amounts of ullage gas flow from the surge tanks 210 and 212 to the catalytic inerting system 320.

In an example, the ullage gas ports 402 and 408 may be used in addition to the ullage gas ports 302, 304, 308, 310, 322, and 324 shown in FIG. 3A. In another example, the ullage gas ports 402 and 408 may be used in lieu of the ullage gas ports 302, 304, 308, 310, 322, and 324. In this example, the fuel tank 204 might not have separate ullage gas ports, as the ullage gas therein is delivered through the vent system (e.g., the vent lines 226, 230, and 232) to the surge tank 210, from which the ullage gas is then transferred to the catalytic inerting system 320.

In examples, referring back to FIG. 2, the vent openings 214 and 216 may be "open" or "free-flowing" to allow the surge tanks 210 and 212 to communicate with the ambient environment around the aircraft. In other words, the vent inlet port 250A is directly coupled to the vent outlet port 250B through the vent line 222 with no flow restriction, and the vent inlet port 251A is directly coupled to the vent outlet port 251B through the vent line 234 with no flow restriction.

In examples, the vent openings 214 and 216 may each include a National Advisory Committee for Aeronautics (NACA) scoop, as depicted in FIGS. 2-4. A NACA scoop may include a shallow ramp with curved walls recessed into an exposed surface of a streamlined body of the aircraft. The geometry of the NACA scoop generates a small positive pressure that helps define the pressure condition in the ullage space and benefits the performance of fuel pumps. NACA scoops are used herein as examples for illustration only, and other vent inlet and outlet designs could be used as well.

In an example, with this "free-flowing" unrestricted configuration, the vent openings 214 and 216 could allow outside air from the ambient environment to enter the inerting system and create an undesirable diluting effect on the inertness of the ullage gas. In order to reduce the amount of ambient air entering the inerting system, flow through the vent openings 214 and 216 could be restricted or controlled via respective flow orifices or valves. This way, fluid communication between the surge tanks 210 and 212 and the ambient environment around the aircraft could be controlled.

Figure 5:
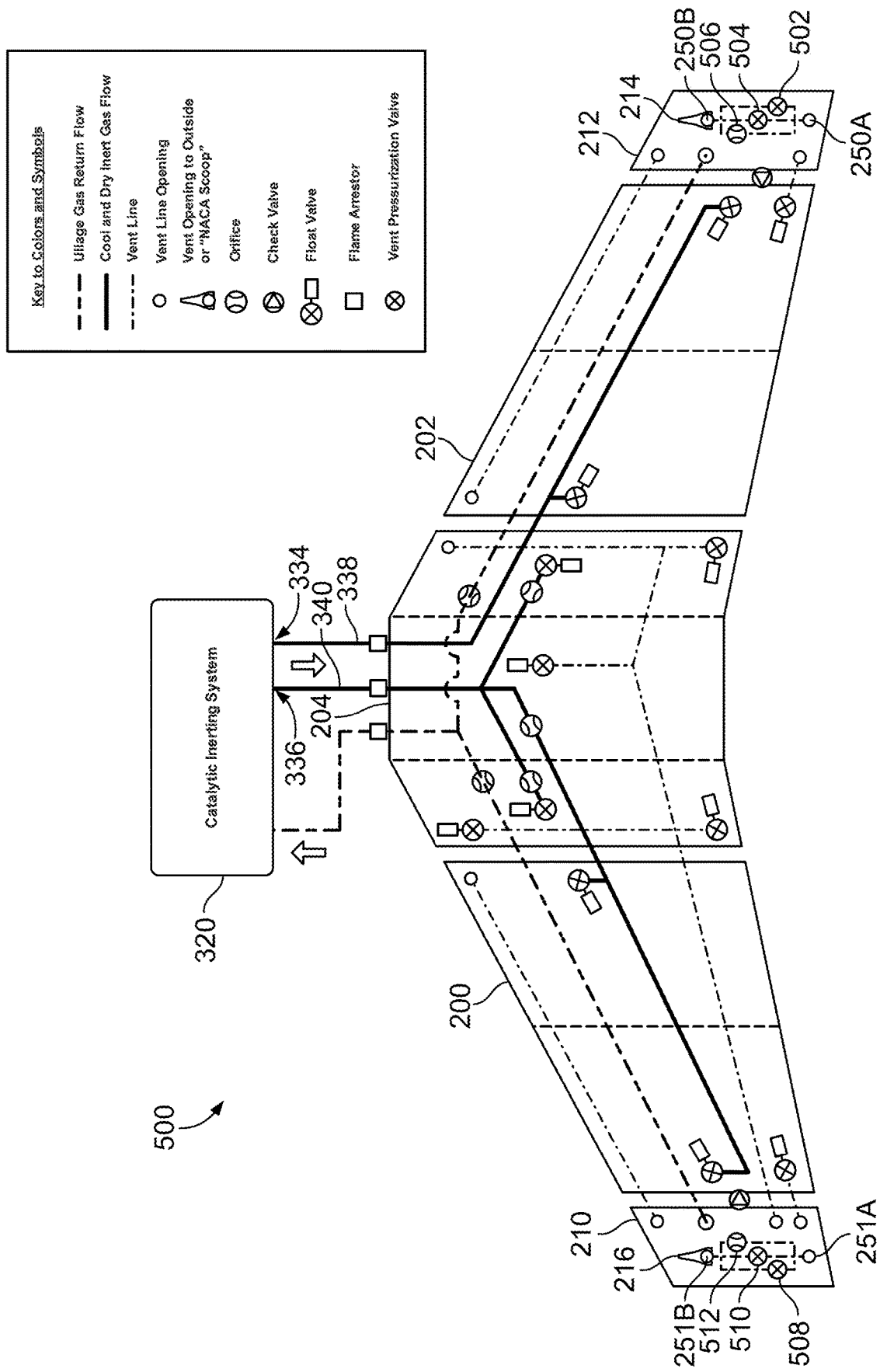
FIG. 5 illustrates a plan view of an ullage-recirculating inerting system with controlled vent openings, in accordance with an example implementation.

FIG. 5 illustrates a plan view of an ullage-recirculating inerting system 500 with controlled vent openings, in accordance with an example implementation. The vent inlet port 250A could be connected to the vent outlet port 250B, which delivers the ullage gas to the vent opening 214, via a first valve assembly. In an example, as depicted in FIG. 5, the first valve assembly may include one or more of: a first valve 502, a second valve 504, and a flow control orifice 506. Similarly, the vent inlet port 251A could be connected to the vent outlet port 251B, which delivers the ullage gas to the vent opening 216, via a second valve assembly. The second valve assembly includes one or more of: a first valve 508, a second valve 510, and a flow control orifice 512.

The valves 502, 504, 508, and 510 could be any type of flow control valves that when actuated form a fluid passage or an orifice therein of a particular size to allow fluid to flow therethrough at a particular flow rate. The valves 502, 504, 508, and 510 could be electronically controlled via a controller of the system 500, or could be mechanically controlled. For example, the 502, 504, 508, and 510 valves could include pressure relief valves, such that when a pressure drop across a respective valve exceeds a threshold pressure, the respective valve opens. In another example, the valves 502, 504, 508, and 510 could be "climb and dive" valves that are actuated in response to pressure difference between the respective surge tank and ambient pressure exceeding a predetermined threshold pressure. Other valve configurations are possible.

The configuration shown in FIG. 5 is an example for illustration. Other configurations are possible. For example, the first and second valve assemblies may each essentially consist of a single valve (e.g., the valves 502 and 508 respectively). In an example, the valve assemblies may each have two valves for redundancy, e.g., the valve 502 may be a back-up valve in case the valve 504 fails.

In another example, the two valves of each valve assembly may provide at least two flow regimes to respond to different flight conditions. For example, the valve 502 may have a first flow capacity determined by a size of a fluid passage formed therein when the valve 502 is actuated. The valve 504 may have a second flow capacity determined by a size of a respective fluid passage formed therein when the valve 504 is actuated. The valve 502 and the size of the fluid passage formed therein upon actuation may be smaller than the valve 504 and the size of the fluid passage formed therein upon actuation. As such, the first flow capacity may be smaller than the second flow capacity.

With is configuration, the valve 502 may enable the vent system to compensate for slow changes in pressure between the surge tank 212 and the ambient pressure outside the aircraft. Such slow changes in pressure may occur, for example, due to burning fuel during flight or due to relatively slow changes in an altitude of the aircraft, which may result in slow variation in the ambient pressure. Flow through the vent opening 214 that compensate for such slow changes in pressure might be small and may thus be handled by the valve 502. On the other hand, the valve 504 may enable the vent system to accommodate large flows therethrough to compensate for fast changes in pressure during climb or descent of the aircraft. The valves 508 and 510 of the second valve assembly may be similarly configured to the valves 502 and 504 to achieve different flow capacities. These flow rates or capacities of the various valves 502, 504, 508, and 510 may be based on a size of the ullage space, fuel flow rates, aircraft vertical speed and altitude, etc.

In examples, the orifices 506 and 512 may each include a fixed orifice, a variable orifice, or a pressure regulator. The orifices 506 and 512 may allow small amounts of leakage flow therethrough to facilitate balancing pressure levels between the fuel and surge tanks and the ambient environment. The leakage flow rates may be based on fuel flow rate and the surplus or deficit of inert gas generated by the catalytic inerting system 320.

For example, the leakage flows through the orifices 506 and 512 may compensate for volumetric flow disparity, which may occur between the inlet ullage gas flow stream to the catalytic inerting system 320 and the discharge inert gas flow stream therefrom. The volumetric flow disparity may particularly occur due to removal of water from the ullage gas as the ullage gas is processed through the catalytic inerting system 320. The volume of ullage gas entering the catalytic inerting system 320 including water may be larger than the inert gas leaving the catalytic inerting system 320 after removal of the water. Returning a smaller volume of gas to the fuel tanks 200, 202, and 204 than the volume of ullage gas extracted therefrom may depressurize them.

Depressurization could potentially cause damage to the fuel tanks 200, 202, and 204 and wings. The orifices 506 and 512 allow a small amount of leakage flow from the ambient environment to the surge tanks 210 and 212 and then to the fuel tanks 200, 202, and 204 to compensate for the volumetric flow disparity. The amount of leakage through the orifices 506 and 512 may depend on the amount of water vapor removed at the catalytic inerting system 320.

The leakage flows through the orifices 506 and 512 may also compensate for temperature differences between the ullage gas entering the catalytic inerting system 320 and the inert gas discharged therefrom. The inert gas leaving the catalytic inerting system 320 and returning to the fuel tanks 200, 202, and 204 may be at a different temperature and correspondingly at a different density than the ullage gas entering the catalytic inerting system 320. Further, the temperature, and thus the density, of the ullage gas entering the catalytic inerting system 320 may vary during flight of the aircraft. Such differences in temperature and density cause a difference in volume between the ullage gas entering the catalytic inerting system 320 and the inert gas leaving it. The orifices 506 and 512 allow a small amount of leakage flow to or from the ambient environment to the surge tanks 210 and 212 and then to the fuel tanks 200, 202, and 204 to compensate for such difference in volume.

Further, as the aircraft progresses through a particular flight, more and more fuel is consumed by the engines. Therefore, the liquid fuel volume within the fuel tanks 200, 202, and 204 decreases, whereas the volume of the ullage space above the liquid fuel increases. To facilitate filling the progressively increasing volume of the ullage space, the orifices 506 and 512 allow leakage flow from the ambient environment to the surge tanks 210 and 212 and then to the fuel tanks 200, 202, and 204.

In the example implementations shown in FIGS. 3A-5, the inert gas discharged from the catalytic inerting system 320 is split into two flow paths. A first path is defined by the inert gas port 334 and the inert gas line 338, and a second path is defined by the inert gas port 336 and the inert gas line 340. The first path feeds a first subset of fuel tanks (i.e., the fuel tank 202), and the second flow path feeds a second subset of fuel tanks (i.e., the fuel tanks 200 and 204). In an example, each flow path could be controlled by an isolation valve configured to stop the flow of ullage gas to a given subset of fuel tanks for maintenance or safety purposes, for example. In another example, a single isolation valve could be used with the flow split occurring downstream of the isolation valve.

Further, in examples, the catalytic inerting system 320 could be similar to the system 100 in that both may have a single prime mover (e.g., a single blower) configured to circulate the ullage gas through a respective ullage-recirculating inerting system (e.g., the systems 300, 400, and 500). The single prime mover would be configured to feed the above-mentioned two flow paths. However, in other example implementations, more than one prime mover could be used.

Figure 6:
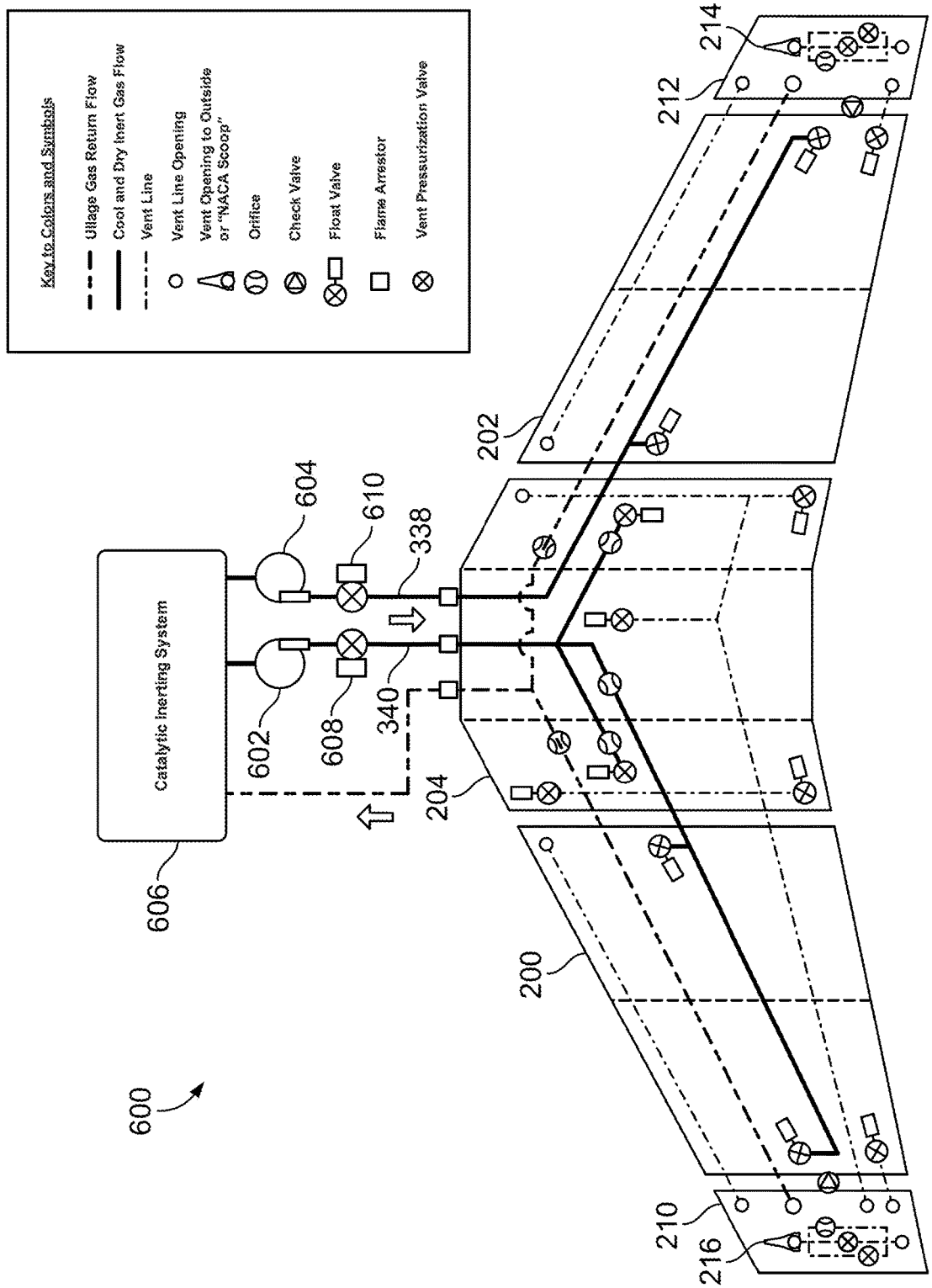
FIG. 6 illustrates an ullage-recirculating catalytic inerting system having two prime movers disposed downstream of a catalytic inerting system, in accordance with an example implementation.

FIG. 6 illustrates an ullage-recirculating catalytic inerting system 600 having two prime movers (e.g., blowers) 602 and 604 disposed downstream of a catalytic inerting system 606, in accordance with an example implementation. The catalytic inerting system 606 may include a catalytic reactor (e.g., the catalytic reactor 106) and a heat exchanger (e.g., the heat exchanger 108). The two prime movers 602 and 604 are disposed downstream from the catalytic inerting system 606 and are configured to feed the fuel tanks 200, 202, and 204 with inert gas produced by the catalytic inerting system 606.

Particularly, the prime mover 602 provides the inert gas through the inert gas line 340 to feed the fuel tanks 200 and 204 with the inert gas, whereas the prime mover 604 provides the inert gas through the inert gas line 338 to feed the fuel tank 202. Isolation valves 608 and 610 could be used to block flow from a respective prime mover to respective fuel tank(s) when desired.

In an example, with this configuration having two prime movers, a size and capacity of a prime mover could be reduced compared to the configuration with a single prime mover. In another example, each of the two prime movers 602 and 604 could be configured to have the capacity to circulate ullage gas through all fuel tanks 200, 202, and 204 in case one of the prime movers fails to provide redundancy.

Further, in the example implementations of FIGS. 3A-6, a single catalytic inerting system is fluidly coupled to the fuel tanks 200, 202, and 204. In other examples, however, a distributed system could be used in which more than one catalytic inerting systems is fluidly coupled to the fuel tanks 200, 202, and 204.

Figure 7:
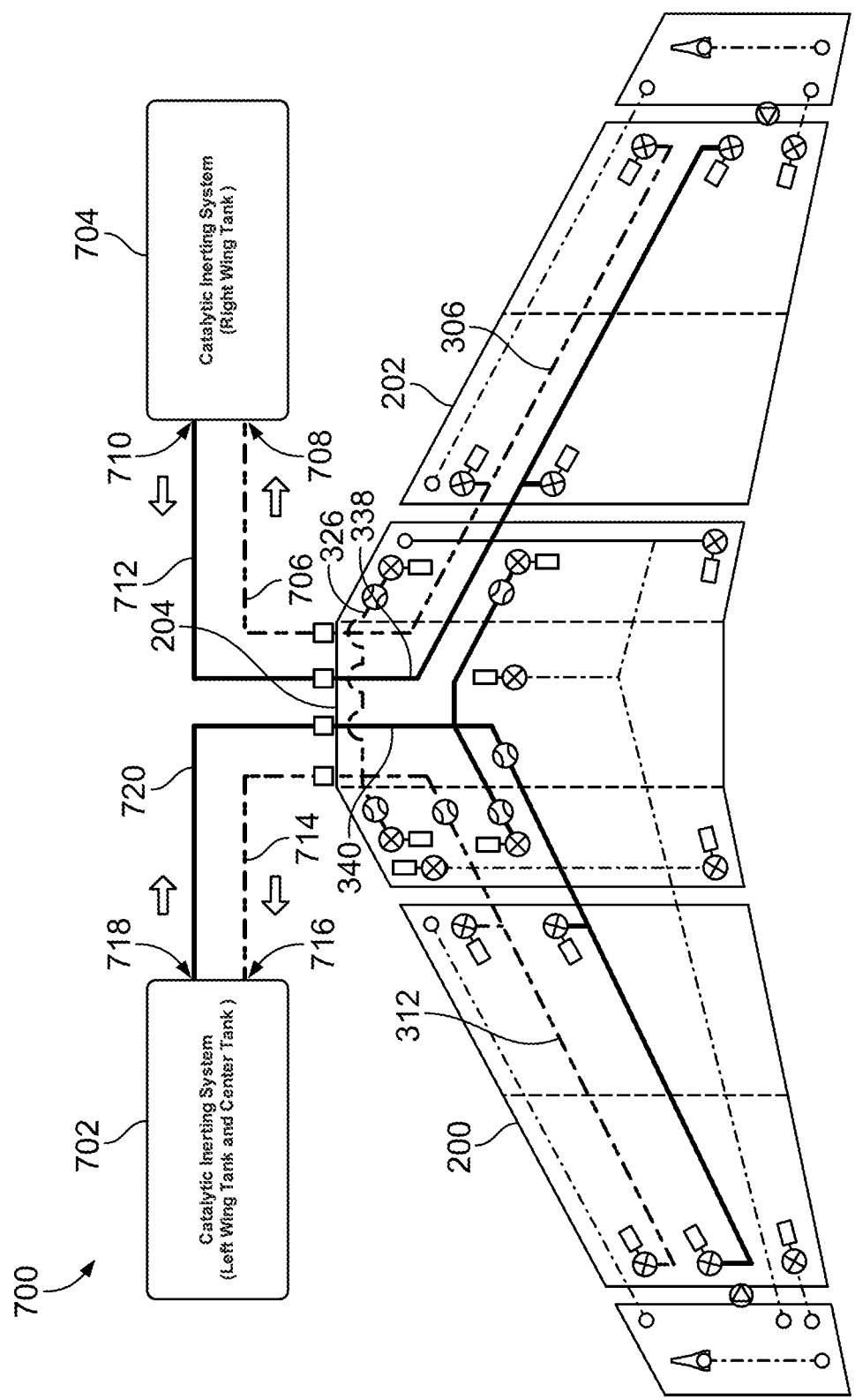
FIG. 7 illustrates an ullage-recirculating catalytic inerting system having two catalytic inerting systems, in accordance with an example implementation.

FIG. 7 illustrates an ullage-recirculating catalytic inerting system 700 having two catalytic inerting systems 702 and 704, in accordance with an example implementation. The two catalytic inerting systems 702 and 704 may be similar to the system 100 shown in FIG. 1. In the configurations described above, the plumbing from a single catalytic inerting system is split to feed the fuel tanks 200 and 204 separately from the fuel tank 202. In the configuration shown in FIG. 7, the two catalytic inerting systems 702 and 704 could be configured such that the catalytic inerting systems 702 feeds the fuel tanks 200 and 204, while the catalytic inerting systems 704 feeds the fuel tank 202.

Particularly, the catalytic inerting system 704 may receive ullage gas from the ullage gas line 306 of the fuel tank 202 through an ullage gas line 706 and an ullage gas inlet port 708. The catalytic inerting system 704 may then provide inert gas through an inert gas outlet port 710 and inert gas line 712 to the inert gas line 338 to feed the fuel tank 202. On the other hand, the catalytic inerting system 702 may receive ullage gas from the ullage gas line 312 of the fuel tank 200 and from the ullage gas line 326 of the fuel tank 204 through an ullage gas line 714 and an ullage gas inlet port 716. The catalytic inerting system 702 may then provide inert gas through an inert gas outlet port 718 and inert gas line 720 to the inert gas line 340 to feed the fuel tanks 200 and 204.

Figure 8:
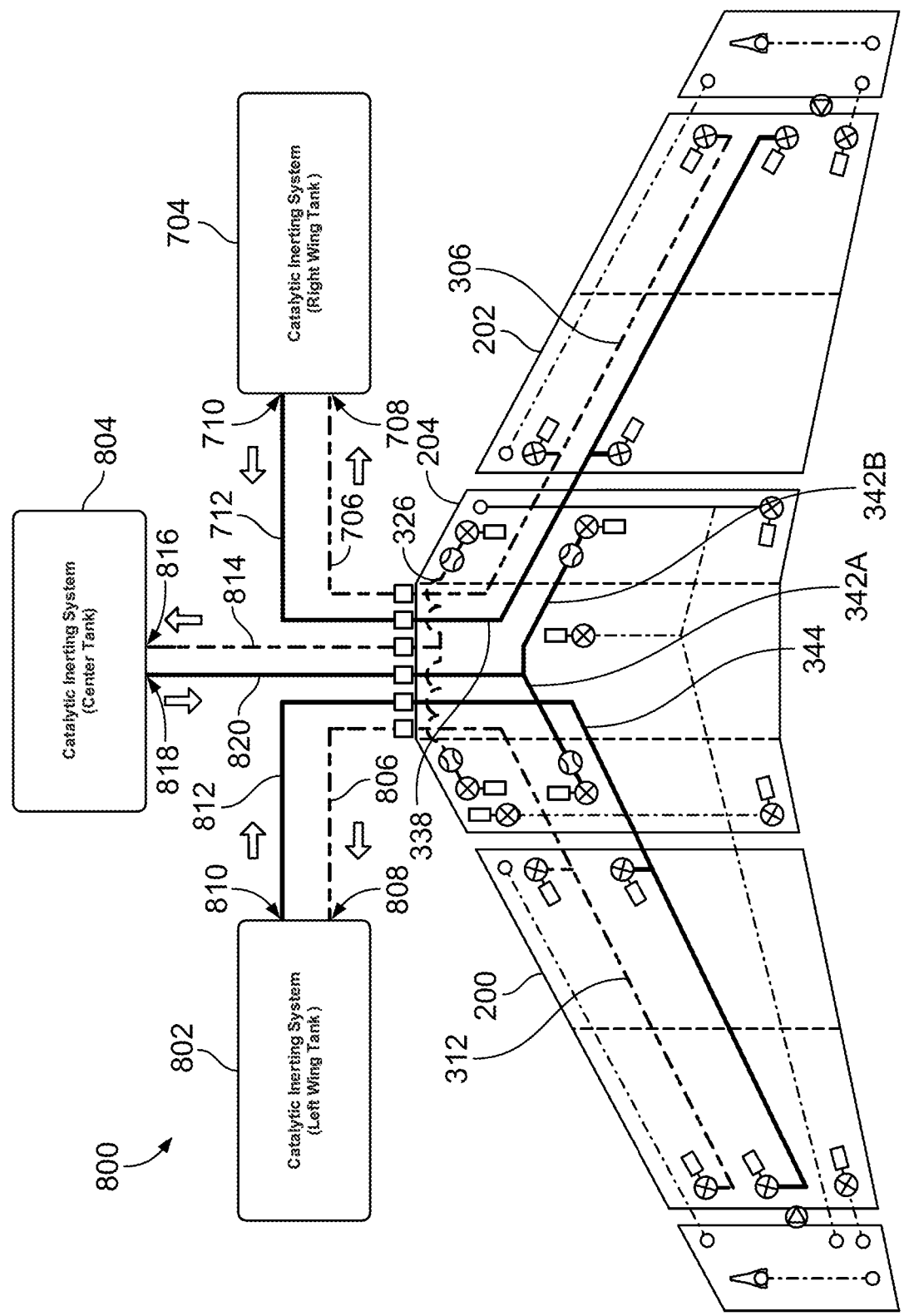
FIG. 8 illustrates an ullage-recirculating catalytic inerting system having three catalytic inerting systems, in accordance with an example implementation.

In another example, a separate catalytic inerting system could be used for each fuel tank. FIG. 8 illustrates an ullage-recirculating catalytic inerting system 800 having three catalytic inerting systems 802, 804, and 704, in accordance with an example implementation. Rather than having a first catalytic inerting system feeding the fuel tanks 200 and 204, and a second catalytic inerting system feeding the fuel tank 202, the catalytic inerting systems 802, 804, and 704 each independently feeds a separate fuel tank.

Particularly, the catalytic inerting system 704 feeds the fuel tank 202 as described above with respect to FIG. 7. Further, the catalytic inerting system 802 may receive ullage gas from the ullage gas line 312 of the fuel tank 200 through an ullage gas line 806 and an ullage gas inlet port 808. The catalytic inerting system 802 may then provide inert gas through an inert gas outlet port 810 and inert gas line 812 to the inert gas line 344 to feed the fuel tank 200.

On the other hand, the catalytic inerting system 804 may receive ullage gas from the ullage gas line 326 of the fuel tank 204 through an ullage gas line 814 and an ullage gas inlet port 816. The catalytic inerting system 804 may then provide inert gas through an inert gas outlet port 818 and inert gas line 820 to the inert gas lines 342A and 342B to feed the fuel tank 204. Thus, the inert gas lines 342A and 342B of the fuel tank 204 are fed separately from the inert gas line 344 of the fuel tank 200. This way, each catalytic inerting system could be independently sized and tuned for the respective fuel tank coupled thereto.

Figure 9:
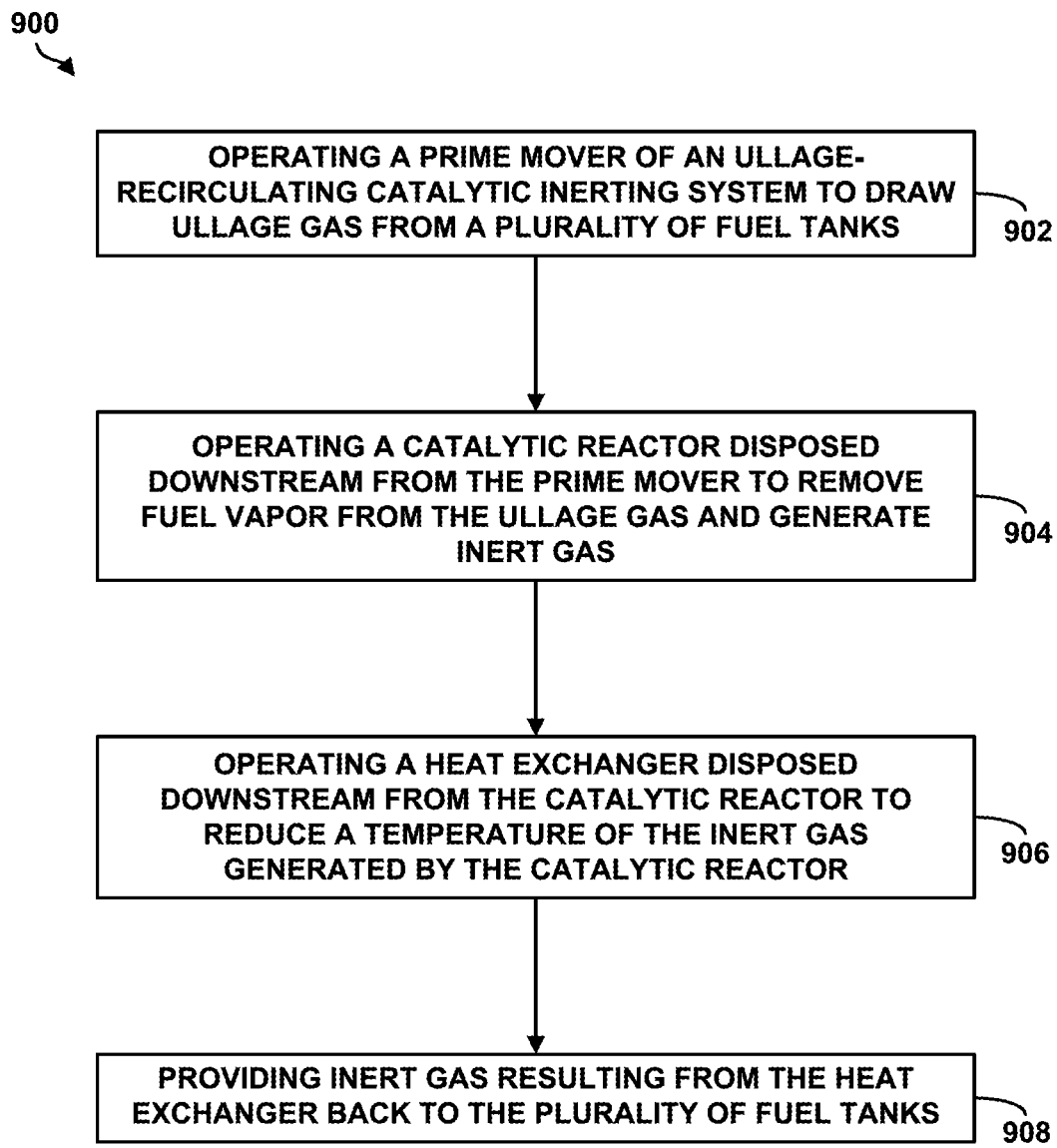
FIG. 9 illustrates a flow chart of a method for operating an ullage-recirculating catalytic inerting system, in accordance with an example implementation.

FIG. 9 is a flow chart 900 of a method for operating an ullage-recirculating catalytic inerting system, in accordance with an example implementation. The operations illustrated in the flow chart 900 could be performed, for example, by a controller of any of the ullage-recirculating catalytic inerting systems described above.

The flow chart 900 may include one or more operations, or actions as illustrated by one or more of blocks 902-908. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the flow chart 900 and other processes and operations disclosed herein, the flow chart 900 shows operation of one possible implementation of present examples. In this regard, each block may represent a module, a segment, or a portion of program code, which includes one or more instructions executable by the controller for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the flow chart 900 and other processes and operations disclosed herein, one or more blocks in FIG. 9 may represent circuitry or digital logic that is arranged to perform the specific logical operations in the process.

At block 902, the flow chart 900 includes operating a prime mover of an ullage-recirculating catalytic inerting system to draw ullage gas from a plurality of fuel tanks. The ullage-recirculating catalytic inerting system could be any of the systems 200, 300, 400, 500, 600, 700, or 800. As such, the ullage-recirculating catalytic inerting system may include a plurality of fuel tanks. Each fuel tank may have (i) respective inert gas ports for discharging the inert gas within a respective fuel tank, and (ii) respective ullage gas ports for drawing ullage gas from the respective fuel tank. At least one fuel tank of the plurality of fuel tanks includes a plurality of ullage gas ports disposed therein at different locations that correspond to respective high points of the at least one fuel tank during respective phases of flight of the aircraft. The ullage-recirculating catalytic inerting system may also include an inert gas generating system including (i) an ullage gas inlet port fluidly coupled to the respective ullage gas ports, (ii) an inert gas outlet port fluidly coupled to the respective inert gas ports, (iii) a catalytic reactor for chemically converting ullage gas received through the ullage gas inlet port to inert gas for discharge through the inert gas outlet port, and (iv) a prime mover for moving gas through the inert gas generating system.

The controller of the ullage-recirculating catalytic inerting system may send a signal to operate the prime mover so as to draw ullage gas from the multiple fuel tanks. The prime mover may have a speed sensor configured to provide the controller with information indicative of a speed of the prime mover (e.g., rotary speed of a prime mover). Accordingly, the controller may control the speed of the prime mover so as to control the flow rate of the ullage gas through inert gas generating system. The inert gas generating system may further include a flow switch downstream from the prime mover, and the controller may send a signal to the flow switch to allow or block flow therethrough based on operating conditions of the inert gas generating system.

At block 904, the flow chart 900 includes operating a catalytic reactor disposed downstream from the prime mover to remove fuel vapor from the ullage gas and generate inert gas. The catalytic reactor may include a heater in a reaction chamber controlled by the controller of the ullage-recirculating catalytic inerting system. The catalytic reactor may also include a fan configured to blow the ullage gas across the heater. The catalytic reactor may further include a temperature sensor configured to provide information indicative of a temperature within the catalytic reactor to the controller. The controller may accordingly control the heater, a chemical reaction process within the catalytic reactor, and the fan to maintain a predetermined temperature in the catalytic reactor. The chemical reaction process may remove oxygen from the ullage gas or reduce its concentration within the ullage gas to generate inert gas. Flame arrestors may be disposed upstream and downstream from the catalytic reactor to prevent a reaction front from leaving the catalytic reactor.

At block 906, the flow chart 900 includes operating a heat exchanger disposed downstream from the catalytic reactor to reduce a temperature of the inert gas generated by the catalytic reactor. The heat exchanger may include a fan configured to blow the inert gas across tubes of the heat exchanger to facilitate heat transfer from the inert gas to a fluid flowing through the tubes. Downstream from the heat exchanger, an oxygen sensor may be disposed to provide the controller with information indicative of oxygen concentration in the inert gas. The controller may accordingly control the catalytic reactor and the heat exchanger to further reduce oxygen concentration, if the concentration exceeds a threshold value.

A condenser may be fluidly coupled to the heat exchanger to collect water in the inert gas to preclude providing water back to the fuel tanks. A temperature sensor may be disposed downstream from the heat exchanger to provide information indicative of a temperature of the inert gas to the controller. The controller may control a speed of the fan in the heat exchanger accordingly to maintain the temperature of the inert gas within a threshold value from a target temperature.

At block 908, the flow chart 900 includes providing inert gas resulting from the heat exchanger back to the plurality of fuel tanks. The inert gas generating system may include isolation valves disposed between the condenser and the fuel tanks to allow or block flow of the inert gas back to the fuel tanks. The inert gas generating system may also include isolation valves disposed between an ullage gas scavenging line emanating from the fuel tanks and the prime movers. The controller may send signals to the isolation valves to allow or block ullage gas flow to the prime mover, and allow or block flow of inert gas emanating from the condenser back to the fuel tanks. The inert gas may be delivered back to inert gas ports disposed at the high points within the fuel tanks as described with respect to FIG. 3A.

Flame arrestors may be disposed downstream from the ullage gas line upstream from the prime mover. Control orifices may be disposed in inert gas lines delivering the inert gas to the fuel tanks, and in the ullage gas line delivering ullage gas from the fuel tanks to the prime mover. In examples, the orifices may be fixed orifices, but in other examples, the orifices may be variable orifices, e.g., electronically controlled valves. The controller may be configured to provide signals to the valves so as to properly apportion inert gas flow to the fuel tanks and ullage gas flow from the fuel tanks.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. An ullage-recirculating catalytic inerting system for an aircraft, the system comprising:
   a plurality of fuel tanks having (i) respective inert gas ports for discharging inert gas within a respective fuel tank, and (ii) respective ullage gas ports for drawing ullage gas from the respective fuel tank, wherein at least one fuel tank of the plurality of fuel tanks includes a plurality of ullage gas ports disposed therein at different locations that correspond to respective high points of the at least one fuel tank during respective phases of flight of the aircraft; and an inert gas generating system including (i) an ullage gas inlet port fluidly coupled to the respective ullage gas ports, (ii) an inert gas outlet port fluidly coupled to the respective inert gas ports, (iii) a catalytic reactor for chemically converting ullage gas received through the ullage gas inlet port to inert gas for discharge through the inert gas outlet port, and (iv) a prime mover for moving gas through the inert gas generating system.

2. The ullage-recirculating catalytic inerting system of claim 1, wherein the plurality of fuel tanks include a first fuel tank coupled to a first side of a fuselage of the aircraft, a second fuel tank coupled to a second side of the fuselage opposite the first side, and a center fuel tank disposed between the first fuel tank and the second fuel tank and coupled to the fuselage of the aircraft.

3. The ullage-recirculating catalytic inerting system of claim 2, wherein the first fuel tank is disposed within a first wing of the aircraft and has a geometry that is angled upwardly from a root of the first wing toward a tip of the first wing, wherein the second fuel tank is disposed within a second wing of the aircraft and has a respective geometry that is angled upwardly from a respective root of the second wing toward a respective tip of the second wing, and wherein at least one of the first fuel tank and the second fuel tank includes two ullage gas ports, a first ullage gas port at the tip of a respective wing, and a second ullage gas port located within a threshold distance from the root of the respective wing and within a respective threshold distance from a forward boundary of the respective wing.

4. The ullage-recirculating catalytic inerting system of claim 3, wherein the second ullage gas port is disposed at a different height relative to a bottom surface of the center fuel tank compared to the first ullage gas port.

5. The ullage-recirculating catalytic inerting system of claim 2, further comprising:
a first surge tank fluidly coupled to the first fuel tank, wherein the first surge tank includes a first vent opening to communicate fluids to and from an ambient environment of the aircraft; and
a second surge tank fluidly coupled to the second fuel tank, wherein the second surge tank includes a second vent opening to communicate fluids to and from the ambient environment of the aircraft, wherein the center fuel tank is fluidly coupled to one of the first surge tank and the second surge tank.

6. The ullage-recirculating catalytic inerting system of claim 5, wherein respective ullage gas ports of the center fuel tank are fluidly coupled to one of the first vent opening and the second vent opening.

7. The ullage-recirculating catalytic inerting system of claim 5, wherein each fuel tank of the plurality of fuel tanks includes a respective plumbing network for providing ullage gas entering through the respective ullage gas ports to one of the first and second surge tanks, wherein each of the first and second surge tanks includes: (i) a first ullage gas port for receiving the ullage gas from the respective plumbing network, and (ii) a second ullage gas port for drawing the ullage gas and providing the ullage gas to the ullage gas inlet port of the inert gas generating system.

8. The ullage-recirculating catalytic inerting system of claim 5, wherein at least one surge tank of the first and second surge tanks includes a valve assembly having at least one valve configured to form a fluid passage therein to allow flow of fluid from the surge tank to the ambient environment of the aircraft when pressure level within the surge tank is greater than a respective pressure level of the ambient environment of the aircraft, while allowing air to flow from the ambient environment of the aircraft into the surge tank when the pressure level within the surge tank is less than the respective pressure level of the ambient environment of the aircraft.

9. The ullage-recirculating catalytic inerting system of claim 8, wherein the valve assembly comprises:
a first valve configured to form a first fluid passage therein to allow air to flow through the valve assembly at a first flow rate; and
a second valve disposed in parallel with the first valve and configured to form a second flow passage therein to allow air to flow through the valve assembly at a second flow rate higher than the first flow rate.

10. The ullage-recirculating catalytic inerting system of claim 9, wherein the valve assembly further comprises:
a flow control orifice disposed in parallel with the first valve and the second valve, wherein the flow control orifice is configured to allow air to flow through the valve assembly at a third flow rate that is less than both the first flow rate and the second flow rate.

11. The ullage-recirculating catalytic inerting system of claim 8, wherein the valve assembly consists essentially of a single valve.

12. The ullage-recirculating catalytic inerting system of claim 1, further comprising:
a plurality of float valves coupled to the respective ullage gas ports so as to control flow of fuel through the respective ullage gas ports.

13. The ullage-recirculating catalytic inerting system of claim 1, further comprising:
a flow control orifice disposed in a plumbing network line connecting an ullage gas port of the respective ullage gas ports to the ullage gas inlet port of the inert gas generating system to control flow of the ullage gas therebetween.

14. The ullage-recirculating catalytic inerting system of claim 1, wherein an inert gas port of the respective inert gas ports is disposed underneath fuel surface level within the respective fuel tank, and wherein the prime mover is configured to provide the inert gas at a pressure level that is higher than fuel pressure level at the inert gas port.

15. The ullage-recirculating catalytic inerting system of claim 1, wherein the at least one fuel tank of the plurality of fuel tanks includes a plurality of inert gas ports disposed within a threshold distance from the plurality of ullage gas ports at the different locations that correspond to the respective high points of the at least one fuel tank during the respective phases of flight of the aircraft.

16. The ullage-recirculating catalytic inerting system of claim 1, wherein the prime mover is a first prime mover for moving the gas through the inert gas generating system and providing the inert gas to a first subset of fuel tanks of the plurality of fuel tanks, and wherein the ullage-recirculating catalytic inerting system further comprises:
a second prime mover for moving gas through the inert gas generating system and providing the inert gas to a second subset of fuel tanks of the plurality of fuel tanks.

17. The ullage-recirculating catalytic inerting system of claim 16, wherein the first prime mover and the second prime mover are disposed within the inert gas generating system downstream from the catalytic reactor.

18. The ullage-recirculating catalytic inerting system of claim 17, wherein the plurality of fuel tanks include a first fuel tank coupled to a first wing of the aircraft, a second fuel tank coupled to a second wing of the aircraft, and a center fuel tank disposed between the first fuel tank and the second fuel tank and coupled to a fuselage of the aircraft, and wherein the first prime mover is configured to provide the inert gas to one of the first fuel tank, the second fuel tank, and the center fuel tank, whereas the second prime mover is configured to provide the inert gas to both remaining tanks.

19. The ullage-recirculating catalytic inerting system of claim 1, wherein the inert gas generating system is a first inert gas generating system for providing the inert gas to a first subset of fuel tanks of the plurality of fuel tanks, and wherein the ullage-recirculating catalytic inerting system further comprises:
a second inert gas generating system for providing respective inert gas to a second subset of fuel tanks of the plurality of fuel tanks.

20. The ullage-recirculating catalytic inerting system of claim 19, wherein the plurality of fuel tanks include a first fuel tank coupled to a first wing of the aircraft, a second fuel tank coupled to a second wing of the aircraft, and a center fuel tank disposed between the first fuel tank and the second fuel tank and coupled to a fuselage of the aircraft, and wherein the first inert gas generating system is configured to provide the inert gas to one of the first fuel tank, the second fuel tank, and the center fuel tank, whereas the second inert gas generating system is configured to provide the respective inert gas to both remaining tanks.

21. The ullage-recirculating catalytic inerting system of claim 19, wherein the ullage-recirculating catalytic inerting system further comprises:
a third inert gas generating system, wherein the first inert gas generating system is configured to provide the inert gas to a first fuel tank, wherein the second inert gas generating system is configured to provide the inert gas to a second fuel tank, and wherein the third inert gas generating system is configured to provide the inert gas to a third fuel tank.

22. An ullage-recirculating catalytic inerting system for an aircraft, the system comprising:
a plurality of fuel tanks having (i) respective inert gas ports for discharging inert gas within a respective fuel tank, and (ii) respective ullage gas ports for drawing ullage gas from the respective fuel tank; and
an inert gas generating system including (i) an ullage gas inlet port fluidly coupled to the respective ullage gas ports, (ii) an inert gas outlet port fluidly coupled to the respective inert gas ports, (iii) a catalytic reactor for chemically converting the ullage gas received through the ullage gas inlet port to inert gas for discharge through the inert gas outlet port, and (iv) at least two prime movers: a first prime mover for moving gas through the inert gas generating system and providing the inert gas to a first subset of fuel tanks of the plurality of fuel tanks, and a second prime mover for moving gas through the inert gas generating system and providing the inert gas to a second subset of fuel tanks of the plurality of fuel tanks.

23. The ullage-recirculating catalytic inerting system of claim 22, wherein at least one fuel tank of the plurality of fuel tanks includes a plurality of ullage gas ports disposed therein at different locations that correspond to respective high points of the at least one fuel tank during respective phases of flight of the aircraft.

24. An ullage-recirculating catalytic inerting system for an aircraft, the system comprising:
a plurality of fuel tanks having (i) respective inert gas ports for discharging inert gas within a respective fuel tank, and (ii) respective fuel tank ullage gas ports and plumbing network for drawing ullage gas from the respective fuel tank and providing the ullage gas to a surge tank of a plurality of surge tanks fluidly coupled to the plurality of fuel tanks;
an inert gas generating system disposed external to the plurality of surge tanks, wherein the inert gas generating system comprises (i) an ullage gas inlet port, (ii) an inert gas outlet port fluidly coupled to the respective inert gas ports, (iii) a catalytic reactor for chemically converting the ullage gas received through the ullage gas inlet port to inert gas for discharge through the inert gas outlet port, and (iv) a prime mover for moving gas through the inert gas generating system, wherein each surge tank of the plurality of surge tanks includes: (i) a vent opening to communicate fluids to and from an ambient environment of the aircraft, and (ii) a first ullage gas port for receiving the ullage gas from the respective fuel tank, and (iii) a second ullage gas port for drawing the ullage gas and providing the ullage gas to the ullage gas inlet port of the inert gas generating system.

25. The ullage-recirculating catalytic inerting system of claim 24, wherein at least one fuel tank of the plurality of fuel tanks includes a plurality of ullage gas ports disposed therein at different locations that correspond to respective high points of the at least one fuel tank during respective phases of flight of the aircraft.

* * * * *